United States Patent
Takahashi

(10) Patent No.: US 10,427,468 B2
(45) Date of Patent: Oct. 1, 2019

(54) PNEUMATIC TIRE

(71) Applicant: TOYO TIRE & RUBBER CO., LTD., Osaka-shi, Osaka (JP)

(72) Inventor: Soichi Takahashi, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 311 days.

(21) Appl. No.: 15/353,106

(22) Filed: Nov. 16, 2016

(65) Prior Publication Data
US 2017/0136829 A1    May 18, 2017

(30) Foreign Application Priority Data
Nov. 18, 2015  (JP) .................................. 2015-225682

(51) Int. Cl.
*B60C 11/13*    (2006.01)
*B60C 11/01*    (2006.01)
(Continued)

(52) U.S. Cl.
CPC .............. *B60C 11/13* (2013.01); *B60C 11/01* (2013.01); *B60C 11/0304* (2013.01); *B60C 11/0306* (2013.01); *B60C 11/1376* (2013.01); *B60C 2011/0341* (2013.01); *B60C 2011/0346* (2013.01); *B60C 2011/0348* (2013.01);
(Continued)

(58) Field of Classification Search
CPC ..... B60C 11/01; B60C 11/13; B60C 11/0083; B60C 2011/013; B60C 11/0304; B60C 11/0306; B60C 2011/0341; B60C 2011/0355; B60C 11/1376;
(Continued)

(56) References Cited

U.S. PATENT DOCUMENTS

| | | | | |
|---|---|---|---|---|
| 5,323,825 A | * | 6/1994 | Yamagishi | B60C 11/01 152/209.21 |
| 2013/0240101 A1 | | 9/2013 | Kameda | |
| 2017/0174009 A1 | | 6/2017 | Suga | |

FOREIGN PATENT DOCUMENTS

| | | | | |
|---|---|---|---|---|
| GB | 893414 | * | 4/1962 | ............. B60C 11/01 |
| JP | 1-95911 | * | 4/1989 | ............. B60C 11/01 |

(Continued)

OTHER PUBLICATIONS

JP 2-241803, English language machine translation [epo.org] (Year: 1990).*

(Continued)

*Primary Examiner* — Eric Hug
(74) *Attorney, Agent, or Firm* — Westerman, Hattori, Daniels & Adrian, LLP

(57) ABSTRACT

In a pneumatic tire, in which a sub-groove 31 extending in a tire circumferential direction is provided on a shoulder land portion inside a width direction center of the shoulder land in a tire width direction, and the shoulder land portion is divided into an inner portion 34 inside the sub-groove 31 in the tire width direction and an outer portion 35 outside the sub-groove 31 in the tire width direction, the shoulder land portion protrudes to the outside of a tire reference profile line L in a normal direction of the tire reference profile line on a cross-section in the tire width direction and a protrusion height H2 at an sub-groove 31 side end of the outer portion 35 is higher than a protrusion height H1 at a sub-groove 31 side end of the inner portion 34.

7 Claims, 2 Drawing Sheets

(51) Int. Cl.
  *B60C 11/03*  (2006.01)
  *B60C 11/12*  (2006.01)
(52) U.S. Cl.
  CPC ............... *B60C 2011/0355* (2013.01); *B60C 2011/1213* (2013.01)
(58) Field of Classification Search
  CPC ..... B60C 2011/0346; B60C 2011/0348; B60C 2011/1338
  USPC .......................... 152/209.14, 209.15, 205.16
  See application file for complete search history.

(56) References Cited

FOREIGN PATENT DOCUMENTS

| | | | | |
|---|---|---|---|---|
| JP | 2-241803 | * | 9/1990 | ............ B60C 11/01 |
| JP | 6-48117 A | | 2/1994 | |
| JP | 4973020 B2 | | 7/2012 | |
| JP | 2013-189121 A | | 9/2013 | |
| JP | 2015-189292 A | | 11/2015 | |

OTHER PUBLICATIONS

JP 1-95911, English language machine translation [epo.org] (Year: 1989).*
Office Action dated Jun. 4, 2019, issued in counterpart JP Application No. 2015-225682, with partial English translation. (6 pages).

* cited by examiner

PNEUMATIC TIRE

CROSS-REFERENCE TO RELATED APPLICATIONS

This application is based on and claims priority from Japanese Patent Application No. 2015-225682 (filed Nov. 18, 2015). The present application incorporates Japanese Patent Application No. 2015-225682 in its entirety by reference.

TECHNICAL FIELD

The present invention relates to a pneumatic tire.

BACKGROUND ART

A pneumatic tire is provided with plural main grooves extending in a tire circumferential direction and plural land portions separated, from each, other by the main, grooves. A pneumatic tire is known in which, among these land portions, a shoulder land portions on an outer side in the tire width direction are provided with sub-grooves extending in the tire circumferential direction for the purpose of, for example, preventing uneven abrasion. The sub-grooves are narrower than the main grooves.

As described in Japanese Unexamined Patent Publication No. 2013-189121 and Japanese Patent No. 4973020, a pneumatic tire is also known in which at least some of land portions protrude to the outside of a tire reference profile line in a normal direction of the tire reference profile line.

DISCLOSURE OF THE INVENTION

The shoulder land portion provided with a sub-groove as described above is susceptible to a bucking deformation (deformation caused by buckling), which may cause ground contact pressure near the sub-groove to easily decrease. A dramatic decrease in ground contact pressure near a sub-groove adversely affects the braking performance and the steering stability performance.

In particular, in a case where the sub-grooves are provided inside the width direction centers of the shoulder land portions in the tire width direction, compared to the inner portions of the shoulder land portions in the tire width direction, the outer portions of the shoulder land portions in the outside of the sub-grooves in the tire width direction have a broader ground contact area, such that the ground contact pressure tends to decrease, or has a longer distance in the width direction thereof and thus easily suffers from a buckling deformation such that the ground contact pressure near the sub-groove tends to greatly decrease. In addition, the outer portion of the shoulder land portion outside the sub-groove in the tire width direction is greatly inflated outward in a tire radial direction when the tire is inflated and thus easily suffers from buckling deformation such that ground contact pressure near the sub-groove tends to greatly decrease.

The present invention has been made in consideration of the foregoing circumstances, and in a pneumatic tire having sub-grooves provided inside the width direction center of the shoulder land portion in the tire width direction, the present invention is to provide a pneumatic tire in which the ground contact pressure near the sub-groove is suppressed from decreasing.

A pneumatic tire of an exemplary embodiment includes: a plurality of main grooves provided to extend in a tire circumferential direction; a shoulder land portion between a shoulder-side main groove positioned outside in a tire width direction among the plurality of main grooves and a ground contact end; and a sub-groove provided on the shoulder land portion at the inside of a width direction center of the shoulder land portion in the tire width direction and extending in the tire circumferential direction, the shoulder land portion being divided into an inner portion inside the sub-groove in the tire width direction and an outer portion more outside the sub-groove in the tire width direction. The shoulder land portion protrudes to the outside of a tire reference profile line in a normal direction of the tire reference profile line on a cross-section in the tire width direction and a protrusion height at a sub-groove side end of the outer portion is higher than a protrusion height at a sub-groove side end of the inner portion.

The pneumatic tire according to the present exemplary embodiment is able to prevent ground contact pressure from decreasing near the sub-groove.

BEST MODE FOR CARRYING OUT THE INVENTION

The pneumatic tire according to an exemplary embodiment will be described with reference to the drawings. The drawings may be exaggerated for illustrative purposes.

The pneumatic tire according to the exemplary embodiment has the same cross-sectional structure as a conventional one, except for a tread. The pneumatic tire has a pair of bead portions on the opposite sides in the tire width direction. Each of the bead portions includes a bead core in which a bundle of steel wires is coated with rubber and a bead filler that is a rubber member provided outside the bead core in the tire radial direction. In addition, the pneumatic tire also includes a carcass ply that forms a tire skeleton between the pair of bead portions. The carcass ply is formed in a sheet-like shape in which plural ply cords aligned in parallel are coated with rubber. Outside the carcass ply in the tire radial direction, plural belts are stacked. The belts are formed in a sheet-like shape in which plural cords aligned in parallel are coated with rubber. In addition, a belt enhancement layer is also provided outside the belts in the tire radial direction, and a rubber-made tread is provided outside the belt enhancement layer in the tire radial direction. The surface of the tread is a ground contact surface. An inner liner is provided inside the carcass ply in the tire. Sidewalls are formed at the opposite sides of the carcass ply in the tire width direction. On the opposite sides of the carcass ply in the tire width direction, a rubber chafer is provided at a position corresponding to the outside of the bead portion in the tire width direction. The upper portion of the rubber chafer is in contact with the lower portion of each of the sidewalls, respectively. A rim is in contact with the surface of the rubber chafer.

Figure 1:
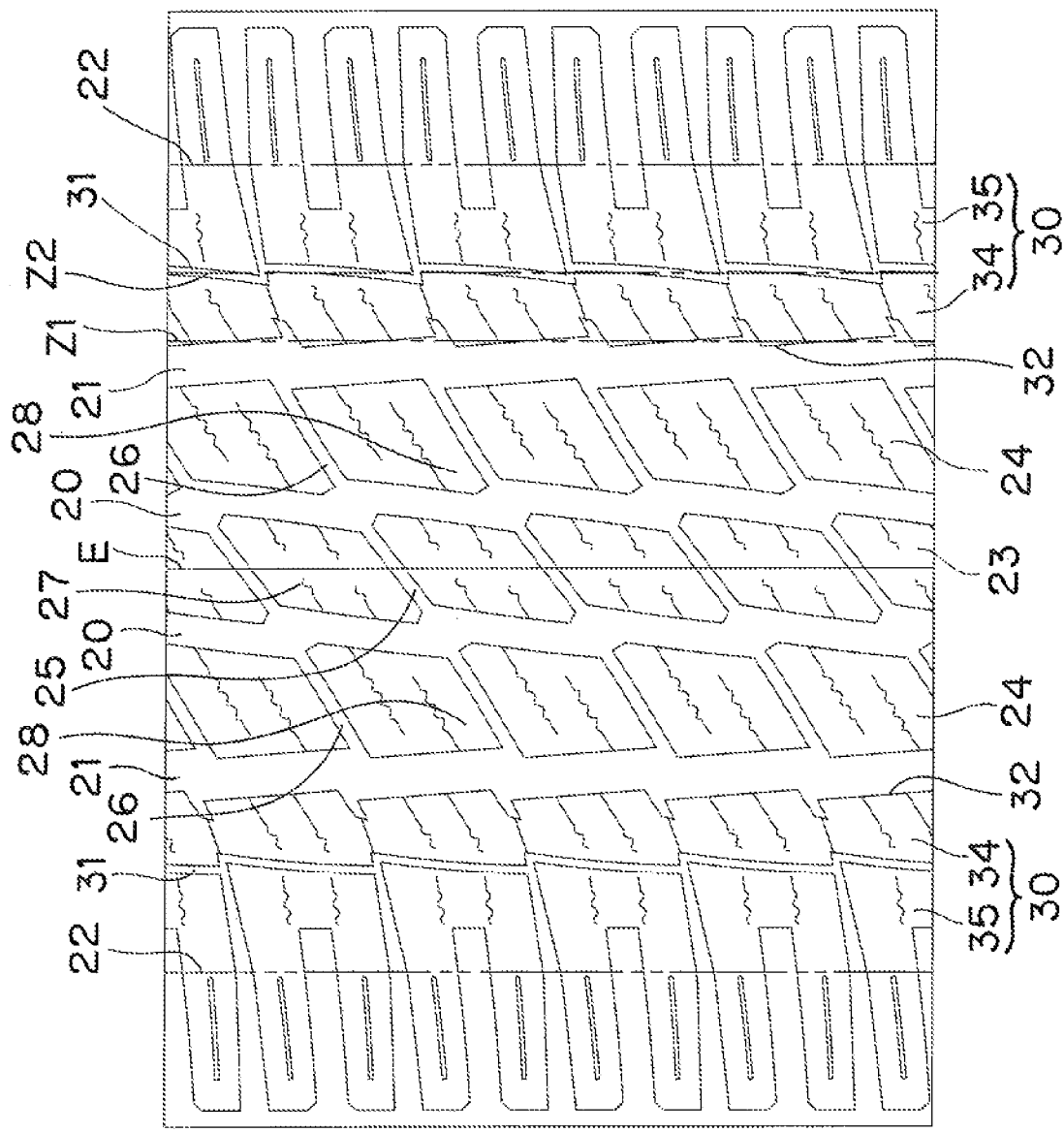
FIG. 1 is a view illustrating a tread pattern of a pneumatic tire of an exemplary embodiment.

A tread pattern according to the present exemplary embodiment is illustrated in FIG. 1. The tread is provided with plural (four (4) in FIG. 1) main grooves extending in the tire circumferential direction. Among the four main grooves, two (2) grooves formed at the inner sides in the tire width direction are center-side main grooves 20, and two (2) grooves formed at the outer sides in the tire width direction are shoulder-side main grooves 21. Further, the main grooves include a main groove that extends along a straight line in the tire circumferential direction, as well as a main groove that has a zigzag shape as illustrated in FIG. 1. Plural land portions are formed which are separated from each other by the main grooves 20, 21 and extend in the tire circumferential direction. The land portion sandwiched between the two center-side main grooves 20 is a center land portion 23 that has a tire equator. The land portions sandwiched between the center-side main grooves 20 and the shoulder-side grooves 21 at the opposite sides of the center land portion 23 in the tire width direction are mediate ribs 24, respectively. The land portions switched between the shoulder main grooves 21 and ground contact ends 22 outside the mediate ribs 24 in the tire width direction are shoulder land portions 30, respectively.

Here, the ground contact ends 22 refer to the ends of the ground contact surface in the tire width direction in the state a pneumatic tire is rim-assembled with a standard rim and reaches a normal internal pressure to be applied with a normal load. The standard rim refers to a standard rim defined in the specifications, such as JATMA, TRA, and ETRTO. In addition, the normal load refers to the maximum load defined in these specifications. Further, the normal internal pressure refers to an internal pressure corresponding to the maximum load.

Each of the shoulder land portions 30 is provided with a sub-groove 31 extending in the tire circumferential direction. The sub-groove 31 includes a sub-groove that extends along a straight line in the tire circumferential direction, as well as a sub-groove that has a zigzag shape as illustrated in FIG. 1. The sub-groove 31 is narrower than the center-side main grooves 20 and the shoulder-side main grooves 21. The width of the sub-groove 31 is 3 mm or less. The sub-groove 31 has a depth L2 that is deep as the depth of a groove other than the main grooves and is, for example, equal to or larger than ⅔ of the depth L1 of the shoulder-side main grooves 21 (see FIG. 2). In addition, the depth L1 of the shoulder-side main grooves 21 and the depth L2 of the sub-grooves 31 are a length extending from the bottoms of the grooves to the tire reference profile line L to be described below in the normal direction of the tire reference profile line L.

The sub-groove 31 is provided inside the position of the width direction center of the shoulder land portion 30. In FIG. 1, each shoulder-side main groove 21 is formed in a zigzag shape and thus, the inner end 32 of the shoulder land portion 30 in the tire width direction also has a zigzag shape. In this case, the position of the width direction center of the shoulder land portion 30 is a central position in the tire width direction between a zigzag center line Z1 (a straight line extending through the center of the amplitude of the zigzag in the tire circumferential direction) at the inner end 32 of the shoulder land portion 30 in the tire width direction and the ground contact end 22. The sub-groove 31 may be provided inside the center location in the tire width direction.

In addition, in FIG. 1, the sub-groove 31 is formed in a zigzag shape. In this case, the zigzag center line Z2 of the sub-groove 31 (a straight line extending through the center of the amplitude of the zigzag in the tire circumferential direction) may be provided inside the position of the tire width center of the shoulder land portion 30.

Each shoulder land portion 30 is divided into an inner portion 34 inside the sub-groove 31 in the tire width direction and an outer portion 35 outside the sub-groove 31 in the tire width direction. Here, a border between the inner portion 34 and the outer portion 35 is formed by the sub-groove 31, and not by the zigzag center line Z2 of the sub-groove 31. The inner end of the inner portion 34 in the tire width direction is aligned with the inner end 32 of the shoulder land portion 30, and the outer end of the inner portion 34 in the tire width direction is aligned with the inner end of the sub-groove 31 in the tire width direction. Also, the inner end of the outer portion 35 in the tire width direction is aligned with the outer end of the sub-groove 31 in the tire width direction, and the outer end of the outer portion 35 in the tire width direction is aligned with the outer end of the shoulder land portion 30 in the tire width direction (ground contact end 22).

The length of the inner portion 34 in the tire width direction, D1, is less than the length of the outer portion 35 in the tire width direction, D2. Here, the length D1 and the length D2 follow the tire reference profile line L to be described below. Further, the length D1 is the actual length of the inner portion 34 in the tire width direction, and not a length from the center line Z1 to the center line 22. Also, the length D2 is the actual length of the outer portion 35 in the tire width direction, and not a length from the center line 22 to the ground contact end 22.

The shoulder land portion 30 is provided with plural transverse grooves and sipes, in addition to the sub-groove 31. Also, the center-side land portion 23 and the mediate land portion 24 are provided with transverse grooves and sipes. With reference to FIG. 1, the center-side land portion 23 and the mediate land portion 24 are divided by the transverse grooves 25, 26 such that blocks 27, 28 form block rows aligned in the tire circumferential direction.

Figure 2:
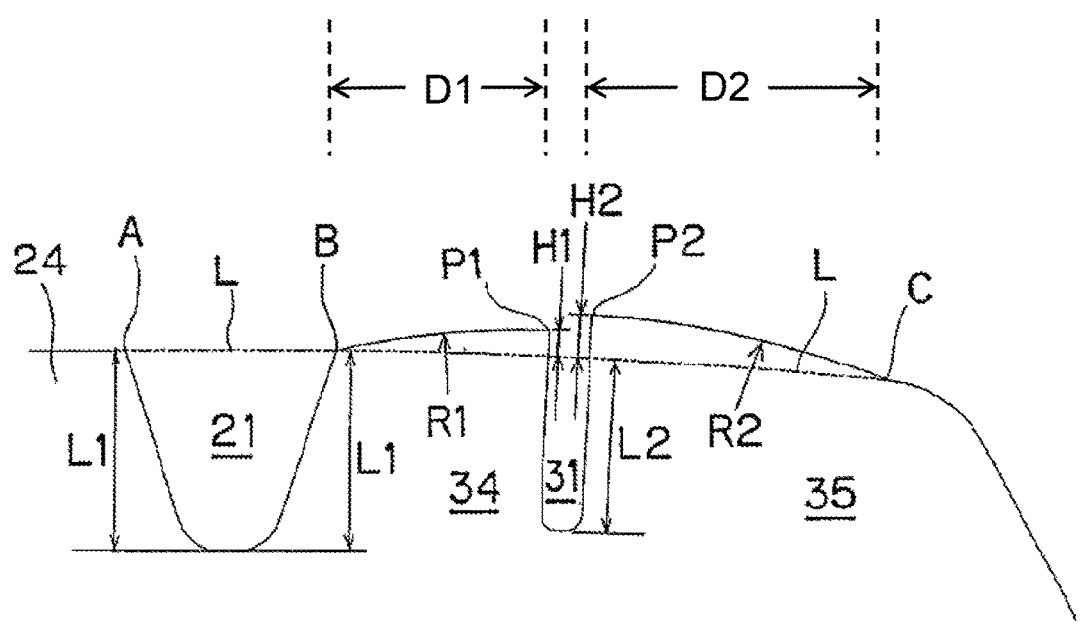
FIG. 2 is a sectional view of a portion near the shoulder land portion in a tire width direction in the tread pattern of the pneumatic tire of the exemplary embodiment.

FIG. 2 illustrates a cross-section of the tread in the tire width direction near the shoulder land portion 30. The length of each portion or the like in the following was measured in the state where the tire was rim-assembled with a standard rim to set the internal pressure to 200 kPa. As illustrated in FIG. 2, the tire reference profile line 1 is set on the cross-section of the shoulder land portion 30 in the tire width direction. The tire reference profile line L refers to an arch line, which passes through three points A, B, and C on the cross-section in the tire width direction. Point A on the cross-section in the tire width direction is a point where the inner sidewall of the shoulder-side main groove 21 in the tire width direction and the ground contact surface of the mediate land portion 24 intersect. In other words, Point A is a point at the outer end of the ground contact surface of the mediate land portion 24 in the tire width direction. Point B next to Point A is a point where the outer sidewall of the shoulder-side main groove 21 in the tire width direction and the ground contact surface of the shoulder land portion 30 intersect. In other words, Point B is a point at the inner end of the ground contact surface of the shoulder land portion 30 in the tire width direction. Points A and B have the same height from the bottom of the shoulder-side main groove 21 and the height is equal to the length of the shoulder-side main groove 21, L1. Point C at the outer side in the tire width direction is a point on the ground contact surface 22. Here, a height of a point from the groove bottom refer to a height from the bottom of the shoulder-side main groove 21 in the normal direction.

The shoulder land portion 30 protrudes to the outside of the tire reference profile line L in the normal direction of the tire reference profile line L. As a result, of the protrusion, the ground contact surface in the inner portion 34 and the outer portion 35 of the shoulder land portion 30 is formed as follows.

In the inner portion 34 of the shoulder land portion 30, the ground contact surface draws a part of an arch on the cross-section in the tire width direction (a curve with a radius curvature R1). The height, of the protrusion (the length of the tire reference profile line L from the tire reference profile line L to the ground contact surface in the normal direction of the tire reference profile line L) is set to be greater as it is nearer to the sub-groove 31. In addition, at an end of the inner portion 34 near the sub-groove 31, a peak of the protrusion, P1 (i.e., the point protruding highest, outward from the tire reference profile line L in the normal direction of the tire reference profile line L), is provided.

Further, in the outer portion 35 of the shoulder land portion 30, the ground contact surface draws a part of the arch on the cross-section in the tire width direction (a curve with a radius, curvature R2). The height of the protrusion is set to be greater as it is nearer to the sub-groove 31. In addition, at an end of the outer portion 35 near the sub-groove 31, a peak of the protrusion, P2 (i.e., the point highest protruding outward from the tire reference profile line L in the normal direction of the tire reference profile line L), is provided.

In addition, the protrusion height H2 of the protrusion peak P2 in the outer portion 35 is higher than the profusion height H1 of the protrusion peak P1 in the inner portion 34. Here, the protrusion heights H1 and H2 of the peaks P1 and P2 refer to a length from the tire reference profile line L to the peaks P1 and P2 in the normal direction of the tire reference profile line L. The relationship between the protrusion heights H1 and H2 may be established on the cross-section in the tire width direction. The protrusion height H1 of the peak P1 in the inner portion 34 is, for example, in a range of from 0.2 mm or more to 2.0 mm or less.

Here, the protrusion height H1 of the protrusion peak P1 in the inner portion 34, the protrusion height H2 of the protrusion peak P2 in the outer portion 35, the length D1 of the inner portion 34 in the tire width direction, and the length D2 of the outer portion 35 in the tire width direction may satisfy the following relational expression.

$$D2/D1 \leq H2/H1 \leq 1.2 \times D2/D1.$$

This relational expression may be established on the cross-section in the tire width direction. That is, in the present exemplary embodiment, since the shoulder-side main groove 21 and the sub-groove 31 have a zigzag shape, the lengths D1 and D2 vary depending on a location in the tire circumferential direction. However, the above relational expression may be established on the cross-section in the tire width direction with respect to each location in the tire circumferential direction.

As described above, in the pneumatic tire according to the present exemplary embodiment, a sub-groove 31 is provided inside the width direction center of the corresponding shoulder land portion 30 in the tire width direction. However, since the shoulder land portion 30 protrudes to the outside of the tire reference profile line L in the normal direction of the tile reference profile line L, it is possible to suppress the ground contact pressure near the sub-groove 31 from decreasing. Further, in the related art, the ground contact pressure in the outer portion 35 near the sub-groove 31 tends to decrease due to a buckling deformation or the like. However, the protrusion height H2 at the end of the outer portion 35 near the sub-groove 31 is higher than the protrusion height H1 at the end of the inner portion 34 near the sub-groove 31. Thus, it is possible to prevent the ground contact pressure of the outer portion 35 near the sub-groove 31 from decreasing. Thus, the pneumatic tire according to the present exemplary embodiment is excellent in braking performance or steering stability performance.

In particular, when both the inner portion 34 and the outer portion 35 of the shoulder land portion 30 have the protrusion peaks P1 and P2 at the sub-groove 31 side ends thereof as in the present exemplary example, it is possible to efficiently prevent the ground contact pressure near the sub-groove 31 from decreasing.

Further, when the depth of the sub-groove 31 is equal to or greater than ⅔ of the depth of the shoulder-side main groove 21, the shoulder land portion 30 is susceptible to a buckling deformation. However, even in such a case, it is possible to suppress the ground contact pressure of the shoulder land portion 30 near the sub-groove 31 from decreasing due to the foregoing constitution.

Also, as described above, when the protrusion height H1 of the protrusion peak P1 in the inner portion 34, the protrusion height H2 of the protrusion peak P2 in the outer portion 35, the length D1 of the inner portion 34 in the tire width direction, and the length D2 of the outer portion 35 in the tire width direction satisfy the relational expression, $D2/D1 \leq H2/H1 \leq 1.2 \times D2/D1$, the protrusion height H2 is neither overly higher nor overly lower than the protrusion height H1 and the ground contact pressure of the entire shoulder land portion 30 becomes uniform.

Here, when the protrusion height H1 of the protrusion peak P1 in the inner portion 34 is within a range of 0.2 mm or more to 2.0 mm or less, the ground contact pressure, particularly on the entire shoulder land portion 30, becomes uniform.

With respect to the present exemplary embodiment, various modifications, substitutions, or omissions may be made without departing from the gist of the present invention. For example, the number of main grooves may be two or more, but may not be four (4) as in the exemplary embodiment described above. Also, the tread pattern is not limited to FIG. 1.

Braking performance and steering stability performance were checked for pneumatic tires of comparative examples and examples listed in Table 1. In Table 1, the inner portion and the outer portion correspond to the inner portion 34 and the outer portion 35 of the shoulder land portion 30 in the exemplary embodiment above, respectively. The definition of the protrusion height or the groove depth in Table 1 is the same as that in the exemplary embodiment described above. Also, the size of every pneumatic tire is 265/65R17.

In the pneumatic tire of Comparative Example 1, the shoulder land portions less protrudes than the tire reference profile line L. In the pneumatic tire of Comparative Example 2, the protrusion height H1 at the sub-groove side end of the inner portion (i.e., a portion where the peak of the protrusion is located) and the protrusion height H2 at the sub-groove side end of the outer portion are the same as each other. In the pneumatic tire of Comparative Example 3, the protrusion height H1 at the sub-groove side end of the inner portion is higher than the protrusion height H2 at the sub-groove side end of the outer portion. The pneumatic tires of Examples 1 and 2 are the same as that of the exemplary embodiment above.

The evaluation method is as follows.

Braking Performance (dry): While a vehicle equipped with pneumatic tires was running on a dry road surface at 100 km/hour, an ABS was operated by applying braking force and the braking distance was measured to obtain the inverse number of the braking distance. In addition, the measurement results were indexed. The indexes were relativized assuming that the index of Comparative Example 1 is 100, which means that the larger the index value, the better the baking performance.

Steering Stability Performance (dry): While a driver was driving straight or cornering on a dry road, sensory evaluation of steps 1-7 was performed at seven (7) steps of steps 1 to 7. A larger value means that the handling performance is superior.

The results are shown in Table 1. It was observed that the pneumatic tires of Examples 1 and 2 have superior braking performance and handling performance.

TABLE 1

|  | Comp. Ex. 1 | Comp. Ex. 2 | Comp. Ex. 3 | Ex. 1 | Ex. 2 |
|---|---|---|---|---|---|
| Protrusion height at sub-groove side end of inner portion H1 (mm) |  | 1.0 | 1.0 | 1.0 | 1.5 |
| Protrusion height at sub-groove side end of outer portion H2 (mm) |  | 1.0 | 0.5 | 1.5 | 2.5 |
| Depth of shoulder-side main groove L1 (mm) | 10.5 | 10.5 | 10.5 | 10.5 | 10.5 |
| Depth of sub-groove L2 (mm) | 8.0 | 8.0 | 8.0 | 8.0 | 8.0 |
| Length of inner portion along tire reference profile line D1 (mm) | 12.0 | 12.0 | 12.0 | 12.0 | 12.0 |
| Length of outer Portion along Tire Reference Profile Line D2 (mm) | 17.0 | 17.0 | 17.0 | 17.0 | 17.0 |
| Curvature radius of ground contact surface of inner Portion on Cross-section in tire width direction R1 (mm) | 200.0 | 80.0 | 80.0 | 80.0 | 50.0 |
| Curvature radius of ground contact surface of outer portion on cross-section in tire width direction R2 (mm) | 200.0 | 120.0 | 180.0 | 100.0 | 70.0 |
| Braking performance (index) | 100 | 98 | 96 | 103 | 102 |
| Steering stability Performance (index) | 4 | 3 | 3 | 5 | 5 |

The invention claimed is:

1. A pneumatic tire comprising:
   a plurality of main grooves provided to extend in a tire circumferential direction;
   a shoulder land portion between a shoulder-side main groove positioned outside in a tire width direction among the plurality of main grooves and a ground contact end; and
   a sub-groove provided on the shoulder land portion at the inside of a width direction center of the shoulder land portion in the tire width direction and extending in the tire circumferential direction, the shoulder land portion being divided into an inner portion inside the sub-groove in the tire width direction and an outer portion more outside the sub-groove in the tire width direction,
   wherein the shoulder land portion protrudes to the outside of a tire reference profile line in a normal direction of the tire reference profile line on a cross-section in the tire width direction and a protrusion height at a sub-groove side end of the outer portion is higher than a protrusion height at a sub-groove side end of the inner portion, and
   wherein, assuming that the protrusion height at the sub-groove side end of the inner portion is H1, the protrusion height at the sub-groove side end of the outer portion is H2, a length of the inner portion along the tire reference profile line is D1, and a length of the outer portion along the tire reference profile line is D2, a following relational expression is satisfied:

$$D2/D1 \leq H2/H1 \leq 1.2 \times D2/D1.$$

2. The pneumatic tire according to claim 1, wherein the depth of the sub-groove is equal to or greater than ⅔ of a depth of the shoulder-side main groove.

3. The pneumatic tire according to claim 1, wherein the protrusion height at the sub-groove side end of the inner portion is in a range of 0.2 mm or more to 2.0 mm or less.

4. The pneumatic tire according to claim 1, wherein the protrusion height of the inner portion inside the sub-groove increases along an arc shape across the inner portion to the peak proximate the inner side of the sub-groove and wherein the protrusion height of the outer portion outside the sub-groove increases along an arc shape across the outer portion to the peak proximate the outer side of the sub-groove.

5. The pneumatic tire according to claim 1, wherein length of the inner portion in the tire width direction is less than the length of the outer portion in the tire width direction.

6. The pneumatic tire according to claim 4, wherein length of the inner portion in the tire width direction is less than the length of the outer portion in the tire width direction.

7. The pneumatic tire according to claim 5, wherein the protrusion height at the sub-groove side end of the inner portion is in a range of 0.2 mm or more to 2.0 mm or less.

* * * * *